(12) United States Patent
Girvin et al.

(10) Patent No.: US 7,283,054 B2
(45) Date of Patent: Oct. 16, 2007

(54) TAMPER-RESISTANT RFID DISABLING APPARATUS AND METHOD OF MANUFACTURING

(75) Inventors: Joshua M. Girvin, Indialantic, FL (US); John W. Lerch, Indialantic, FL (US); Roger W. Pryor, Bloomfield Hills, MI (US)

(73) Assignee: Proximities, Inc., Melborne, FL (US)

( * ) Notice: Subject to any disclaimer, the term of this patent is extended or adjusted under 35 U.S.C. 154(b) by 71 days.

(21) Appl. No.: 11/069,883

(22) Filed: Feb. 28, 2005

(65) Prior Publication Data

US 2005/0248458 A1 Nov. 10, 2005

Related U.S. Application Data

(63) Continuation-in-part of application No. 10/400,049, filed on Mar. 26, 2003, now Pat. No. 7,042,357.

(51) Int. Cl.
*G08B 13/14* (2006.01)
(52) U.S. Cl. .................. 340/572.3; 340/568.2
(58) Field of Classification Search ............... None
See application file for complete search history.

(56) References Cited

U.S. PATENT DOCUMENTS

| | | | |
|---|---|---|---|
| 4,736,196 A | 4/1988 | McMahon et al. |
| 4,800,543 A | 1/1989 | Lyndon-James et al. |
| 4,833,807 A | 5/1989 | McLean |
| 4,835,372 A | 5/1989 | Gombrich et al. |
| 4,885,571 A | 12/1989 | Pauley et al. |
| 4,973,944 A | 11/1990 | Maletta |
| 4,980,671 A | 12/1990 | McCurdy |
| 5,364,133 A | 11/1994 | Hofer et al. |
| 5,374,921 A | 12/1994 | Martin et al. |
| 5,423,574 A | 6/1995 | Forte-Pathroff |
| 5,430,441 A | 7/1995 | Bickley et al. |
| 5,448,846 A | 9/1995 | Peterson et al. |
| 5,457,906 A | 10/1995 | Mosher, Jr. |
| 5,471,197 A | 11/1995 | McCurdy et al. |
| 5,504,474 A | 4/1996 | Libman et al. |
| 5,512,879 A | 4/1996 | Stokes |
| 5,525,969 A | 6/1996 | LaDue |
| 5,612,675 A | 3/1997 | Jennings et al. |
| 5,627,520 A | 5/1997 | Grubbs et al. |
| 5,646,592 A * | 7/1997 | Tuttle ................ 340/545.6 |
| 5,781,442 A | 7/1998 | Engleson et al. |
| 5,831,535 A | 11/1998 | Reisman et al. |
| 5,883,576 A | 3/1999 | De La Huerga |
| 5,973,598 A | 10/1999 | Beigel |
| 5,973,600 A | 10/1999 | Mosher, Jr. |

(Continued)

*Primary Examiner*—Benjamin C. Lee
(74) *Attorney, Agent, or Firm*—Hamilton, Brook, Smith & Reynolds, P.C.

(57) ABSTRACT

A method for manufacturing an RFID disabling apparatus using prefabricated, "off-the-shelf" components. The method includes: disposing a prefabricated RFID circuit and a conductive loop on a substrate, coupling a first end of the conductive loop to a first endpoint of the RFID circuit, and coupling a second end of the conductive loop to a second endpoint of the RFID circuit. An optional electronic component can be coupled between the first endpoint and the second endpoint of the RFID circuit. The RFID circuit can be an "off-the-shelf" RFID circuit. A portion of the RFID circuit can be severed to create the first endpoint and the second endpoint.

34 Claims, 4 Drawing Sheets

U.S. PATENT DOCUMENTS

| | | | |
|---|---|---|---|
| 5,977,877 A | 11/1999 | McCulloch et al. | |
| 5,979,941 A | 11/1999 | Mosher et al. | |
| 6,021,494 A | 2/2000 | Bolan et al. | |
| 6,043,746 A | 3/2000 | Sorrells | |
| 6,050,622 A | 4/2000 | Gustafson | |
| 6,055,756 A | 5/2000 | Aoki | |
| 6,072,396 A | 6/2000 | Gaukel | |
| 6,104,295 A | 8/2000 | Gaisser et al. | |
| 6,104,311 A * | 8/2000 | Lastinger | 340/10.51 |
| 6,107,920 A | 8/2000 | Eberhardt et al. | |
| 6,111,520 A * | 8/2000 | Allen et al. | 340/870.16 |
| 6,142,368 A | 11/2000 | Mullins et al. | |
| 6,144,303 A | 11/2000 | Federman | |
| 6,219,789 B1 | 4/2001 | Little et al. | |
| 6,255,951 B1 | 7/2001 | De La Huerga | |
| 6,335,907 B1 | 1/2002 | Momich et al. | |
| 6,346,886 B1 | 2/2002 | De La Huerga | |
| 6,349,493 B1 | 2/2002 | Newman et al. | |
| 6,352,045 B1 | 3/2002 | Takashima | |
| 6,352,205 B1 | 3/2002 | Mullins et al. | |
| 6,384,727 B1 | 5/2002 | Diprizio et al. | |
| 6,421,013 B1 | 7/2002 | Chung | |
| 6,424,623 B1 | 7/2002 | Borgstahl et al. | |
| 6,431,455 B1 | 8/2002 | Ponert | |
| 6,434,158 B1 | 8/2002 | Harris et al. | |
| 6,434,159 B1 | 8/2002 | Woodward et al. | |
| 6,472,989 B2 | 10/2002 | Roy, Jr. | |
| 6,474,557 B2 | 11/2002 | Mullins et al. | |
| 6,483,427 B1 | 11/2002 | Werb | |
| 6,663,006 B2 | 12/2003 | Mullins et al. | |
| 6,693,543 B1 | 2/2004 | Stephenson et al. | |
| 6,744,367 B1 | 6/2004 | Forster | |
| 6,772,546 B2 | 8/2004 | Latschbacher et al. | |
| 6,782,648 B1 | 8/2004 | Mosher, Jr. | |
| 6,806,812 B1 * | 10/2004 | Cathey | 340/572.7 |
| 2002/0003477 A1 | 1/2002 | Roy, Jr. | |
| 2002/0007292 A1 | 1/2002 | Paxton et al. | |
| 2002/0049656 A1 | 4/2002 | Lancos et al. | |
| 2002/0067264 A1 | 6/2002 | Soehnlen | |
| 2002/0070865 A1 | 6/2002 | Lancos et al. | |
| 2002/0082897 A1 | 6/2002 | Menelly et al. | |
| 2002/0084904 A1 | 7/2002 | De La Huerga | |
| 2003/0075608 A1 | 4/2003 | Atherton | |
| 2003/0173408 A1 | 9/2003 | Mosher, Jr. et al. | |
| 2004/0066296 A1 | 4/2004 | Atherton | |

* cited by examiner

TAMPER-RESISTANT RFID DISABLING APPARATUS AND METHOD OF MANUFACTURING

RELATED APPLICATION

This application is a continuation-in-part of U.S. application Ser. No. 10/400,049, filed Mar. 26, 2003 now U.S. Pat. No. 7,042,357 the entire teachings of which are incorporated herein by reference.

BACKGROUND OF THE INVENTION

Radio-frequency identification (RFID) technologies have been incorporated into bracelets and are being used for such things as identification, access control, and age verification. For example, various venues have begun to use RFID bracelets to quickly and uniquely identify patrons that have access to restricted areas, such as back stage events, alcoholic beverage sales, etc.

These bracelets can be made using a narrow band of plastic or other suitable material and a prefabricated RFID tag, so that they are inexpensive to produce and easy to use. However, such RFID bracelets are susceptible to misuse and unauthorized use. In instances where an RFID bracelet is torn or cut to be removed from a wearer's wrist, the RFID circuit may still continue to function. An RFID bracelet that still serves its purpose after it has been removed could provide patrons with the opportunity to give access to a restricted area to an unauthorized patron. For example, a patron with an "adult" RFID bracelet that allows access to alcoholic beverage sales could be removed and given or sold to a patron not of legal drinking age.

A number of mechanical measures have been taken to prevent such RFID bracelets from being transferred. Most prominent is the use of a single-use locking mechanism found on some plastic bracelets. Also known are adhesive locking mechanisms with slits that prevent the wearer from peeling the adhesive back and reattaching it. These mechanisms render tampering with the locking device obvious to a visual inspection of the RFID bracelet and, in most cases, render the bracelet unwearable after removal. However, tampering with the band portion of the RFID bracelet is not prevented by these mechanisms, nor is the RFID bracelet rendered otherwise inoperative if these mechanisms are tampered with. It is possible for the RFID bracelet to be cut or torn, and reattached with a simple piece of transparent tape. To detect this sort of tampering, the person checking the RFID bracelet would need to either make a full visual inspection of the RFID bracelet or tug very firmly on the RFID bracelet. This is slow, inconvenient, and impractical, especially when large numbers of people require identification. Furthermore, such a visual inspection is subject to human error, the most obvious being the failure of the RFID bracelet checker to perform an adequate inspection.

To enhance the capabilities of these RFID bracelets, some have suggested they be redesigned to include disabling technologies, such as tamper wires running along the length of the bracelet. The use of such disabling technologies has made the process of identifying the bracelet wearer faster and more secure, resulting in an increased use of RFID bracelets for identification purposes and additional uses for bracelets, such as for facilitating transactions. However, the additional circuitry, including tamper wires and/or tamper detection logic circuitry, increases the cost of manufacturing these RFID bracelets.

Furthermore, the unique characteristics of such secure RFID bracelet designs relative to conventional RFID tags means that it is likely that lower volumes of these devices will ultimately be produced. Thus, secure RFID bracelets that are manufactured using the same processes that are used for manufacturing conventional RFID tags will not achieve the same benefits associated with economies of scale that conventional RFID tags may achieve. This further increases the cost of manufacturing these bracelets.

SUMMARY OF THE INVENTION

An RFID bracelet which includes disabling technologies while reducing the cost of manufacture is highly desirable. The present invention thus provides a method of manufacturing an RFID disabling apparatus including an inexpensive prefabricated RFID integrated circuit tag (circuit) and disabling technologies. In one embodiment, the method includes 1) disposing an RFID circuit on a substrate; 2) disposing a conductive loop on the substrate, the conductive loop having a first end and a second end; 3) and coupling the first end of the conductive loop to the first endpoint of the RFID circuit and coupling the second end of the conductive loop to the second endpoint of the RFID circuit. The RFID circuit can be a standard off-the-shelf RFID circuit. A portion of the RFID circuit can be severed to create the first endpoint and the second endpoint.

The conductive loop can run preferably along substantially the entire length of the substrate. The conductive loop can be connected to the RFID circuit such that a break in the conductive loop disables the RFID circuit.

The substrate can include a series of holes along a length thereof. The substrate can be formed of multiple layers, wherein a first conductive loop portion is formed on one layer of the substrate and a second conductive loop portion is formed on a second layer of the substrate. This allows the first conductive loop portion to overlap the second conductive loop portion. Alternatively, the conductive loop can be coated with an insulator to this end.

The RFID circuit can include a prefabricated RFID transponder and an antenna element, wherein a portion of the antenna element is severed to create the first and second endpoints. The antenna element can be a coiled antenna. The RFID circuit can be severed at a point located on an outer periphery of the RFID circuit, such as at a point within the coiled antenna. The severing step can be carried out by laser cutting, wherein the severing step creates a gap between the two endpoints.

In another embodiment, the method can further include coupling one end of an electronic component to the first endpoint of the RFID circuit and coupling the other end of the electronic component to the second endpoint of the RFID circuit. The electronic component can be coupled in series with the first and second endpoints and the conductive loop can be coupled in parallel with the electronic component. The electronic component can be a capacitor, a resistor, or an induction. The value of the capacitor can be chosen to correct the resonance of the RFID circuit with the addition of the conductive loop to the RFID circuit.

In another embodiment, an RFID disabling apparatus includes an RFID circuit disposed on a substrate, the RFID circuit including an electronic component and a conductive loop disposed on the substrate and coupled in parallel to the electronic component. The electronic component can be a capacitor, a resistor, or an induction. A value of the capacitor can be chosen to correct the resonance of the RFID circuit with the addition of the conductive loop to the RFID circuit.

The present invention provides many advantages, such as the ability to utilize relatively inexpensive prefabricated RFID transponders in the manufacturing of a disabling RFID bracelet. It further allows the manufacturing of disabling wristbands to capitalize on the benefits associated with economies of scale that will be achieved by conventional RFID transponders. All of these advantages can be used to reduce the overall costs associated with manufacturing an RFID disabling apparatus.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Generally, passive radio frequency identification (RFID) bracelets include circuits containing an antenna and other circuitry that responds to an RF interrogation signal. In response to the RF interrogation signal, a transponder emits an RF signal representative of information pre-stored or pre-programmed into the transponder. For example, the information could include a serial number, the date the bracelet is issued, the date the bracelet expires and will not longer be usable for access, the age status of the wearer, and/or whether the bracelet can be used for purchasing goods or services. Any other desired information, depending on the context in which the bracelet is to be used, may be pre-stored or pre-programmed in the transponder. Information stored on the transponder chip may also be used to access information stored in a database.

The antenna is typically formed as a wire coil. The transponder is electrically connected to and derives power from the RF signal received by the antenna.

In addition, a connection is made between the antenna and the transponder in the form of a continuous electrically conductive loop that extends along the length of the wristband. The conductive loop serves a disabling function such that severance of any portion of wristband also severs the conductive loop, thus rendering the RFID function of the bracelet inoperable. Consideration should be given to the distance between the sections of the loop antenna that form the conductive loop in order to minimize inductance that can lead to possible interference with operation of the transponder and/or antenna.

Figure 1A:
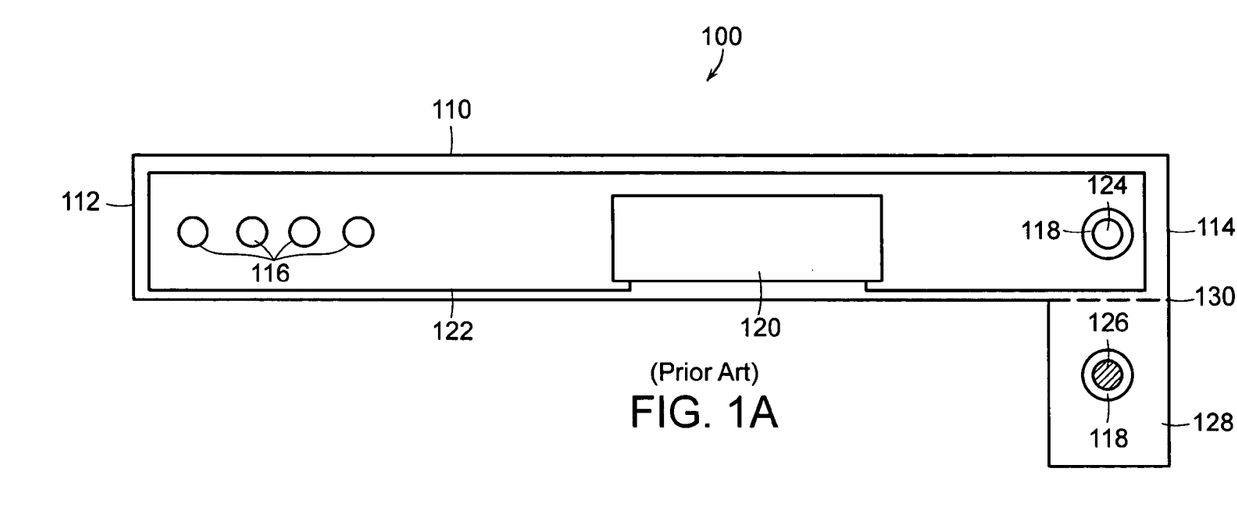
FIG. 1A shows a plan view of an RFID bracelet using a single use locking-hole mechanism according to the prior art.

FIG. 1A is a general illustration of a Radio Frequency Identification (RFID) bracelet 100 using a single use locking-hole mechanism according to the prior art. The bracelet 100 is generally an elongated band 110 with opposite ends 112, 114 that can be brought together and fastened to form a closed loop around a wearer's wrist, for example. The band 110 includes a plurality of adjustment holes 116, a single-use locking mechanism 118, and an RFID transponder circuit 120 including a tamper wire 122 that is an electrically conductive continuous loop running along the length of the band 110. The combination of the RFID transponder circuit 120 and tamper wire 122 preferably span the length of the band 110, such that any cut, tear, or severing made to remove the band 110 from the wearer will necessarily render the bracelet 100 unusable.

The single-use locking mechanism 118 is a mechanical non-reusable tamper-resistant locking mechanism. For example, the single-use locking mechanism 118 can be a barbed peg 124 and a locking hole 126 in a flap 128 of the band 110. The single-use locking mechanism 118 is used to fasten the opposite ends 112, 114 of the band 110 together under the flap 128 to form the closed loop as will be explained in more detail below.

The adjustment holes 116 are used to adjust the bracelet 100 to conform to body parts of different circumferences, e.g. a wrist or an ankle. When the opposite ends 112, 114 of the band 110 are brought together, the barbed peg 124 is inserted through a selected hole 116 as required for a snug fit. The flap 128 is then folded along an imaginary line 130 and the barbed peg 124 is then passed through the locking hole 126. The barbed peg 124 is shaped to resist removal from the locking hole 126 without also destroying the locking mechanism 118 and rendering it incapable of being refastened.

Figure 1B:
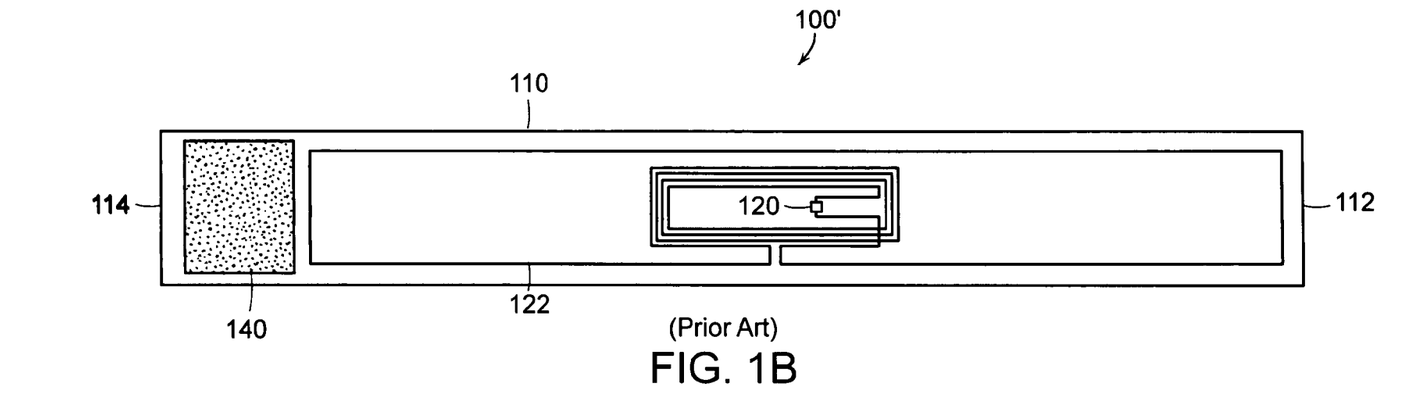
FIG. 1B shows a plan view of an RFID bracelet using an adhesive locking mechanism according to the prior art.

FIG. 1B is a general illustration of an RFID bracelet 100' using an adhesive locking mechanism 140 according to the prior art. The bracelet 100' includes similar components are described with reference to FIG. 1A, except the adjustment holes 116 and the locking mechanism 118 have been replaced with an adhesive locking mechanism 140. The adhesive locking mechanism 140 is used to adjust the bracelet 100 to conform to body parts of different circumferences and is well known in the art.

It is preferable that one of the tamper wire 122 or the RFID transponder circuit 120 overlap with the adhesive mechanism 140. This results in a disabling of the bracelet 100 when the adhesive locking mechanism 140 is pulled apart from the band surface to which it is adhered during bracelet 100' attachment. While the RFID transponder circuit 120 is depicted in the center of the band 110 in the previously described embodiments, it can also be located near or at the opposite ends 112, 114 of the band 110.

Figure 2A:
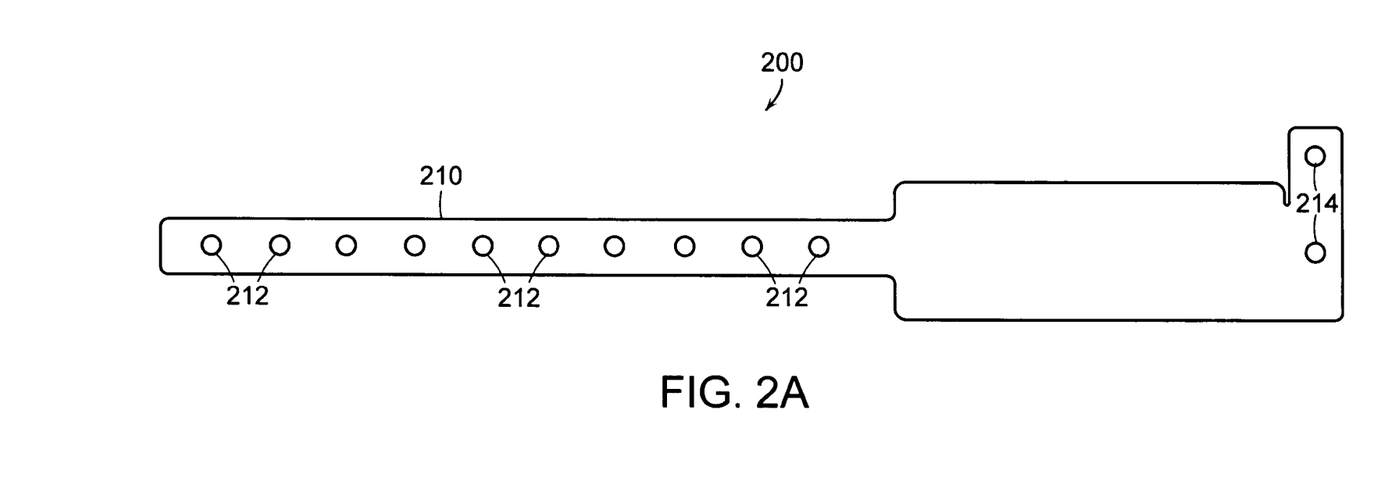
FIGS. 2A-2E illustrate a procedure for manufacturing an RFID disabling apparatus according to the present invention.
Figure 2B:
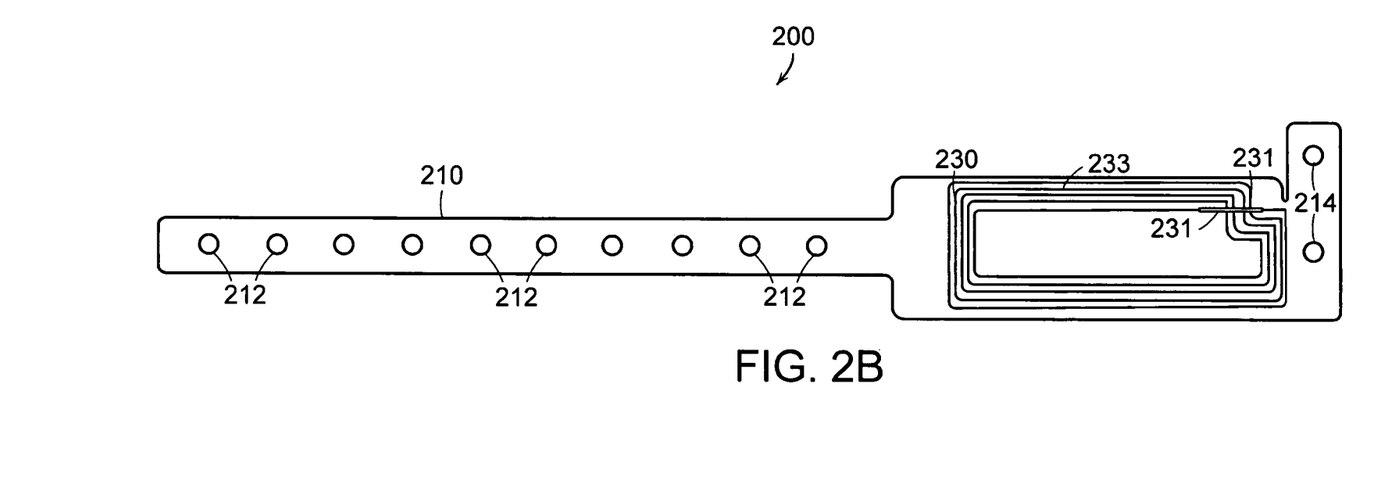
Figure 2C:
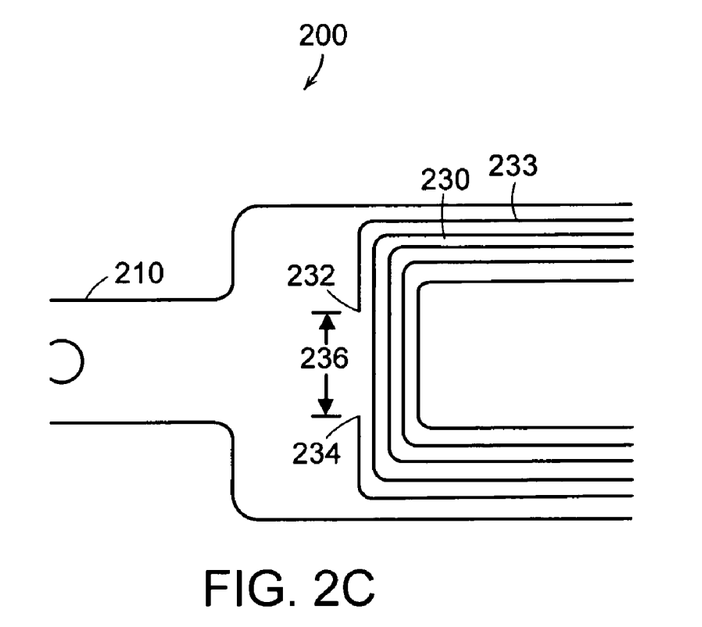
Figure 2D:
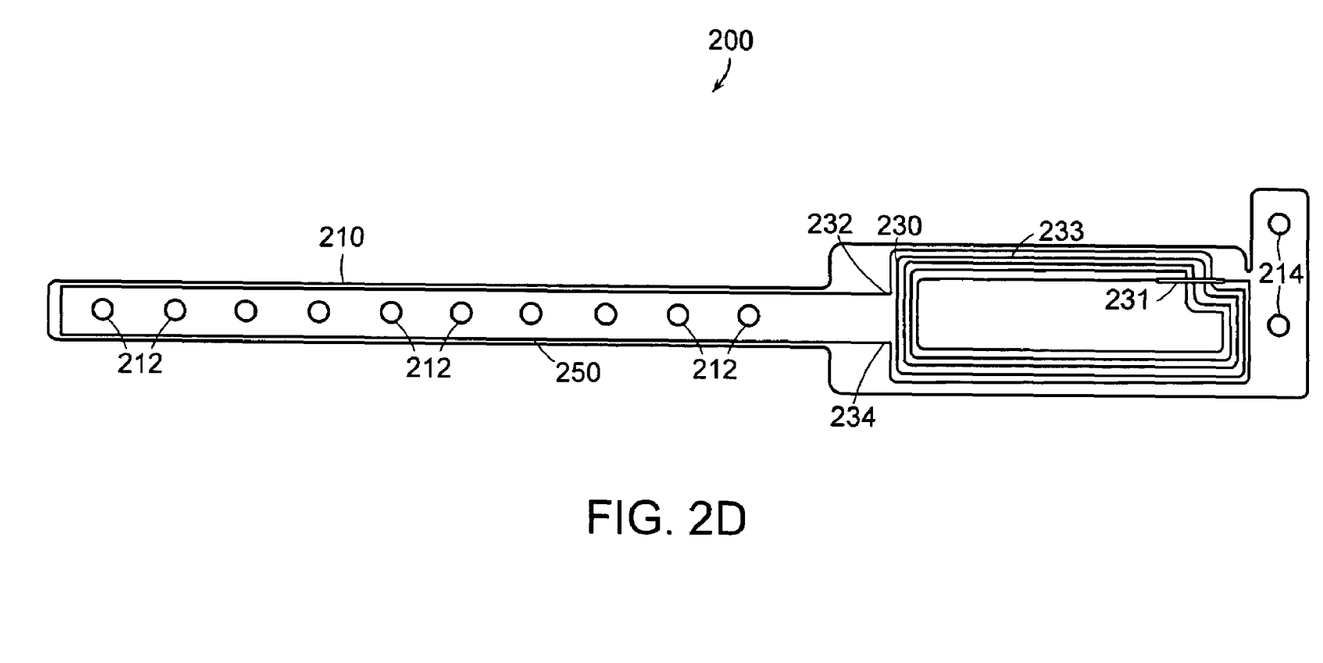

FIGS. 2A-2E illustrate a procedure for manufacturing an RFID disabling apparatus (band) 200 according to the present invention. These components include a substrate 210, a prefabricated RFID circuit (tag) 230, a conductive loop 250 (tamper/disabling wire), and an optional electronic component 270 such as a tuning component. Generally, the prefabricated RFID tag 230 and the conductive loop 250 are disposed on the substrate 210 (FIG. 2B). As shown in FIG. 2C, the RFID tag 230 is severed to create a first end point 232 and a second end point 234. As shown in FIG. 2D, a first end of the conductive loop 250 is coupled to the first end point 232 and a second end of the conductive loop 250 is coupled to the second end point 234. The optional tuning component 270 (FIG. 2E) can be coupled between the first end point 232 and the second end point 234. This tuning component 270 can be a capacitor, a swamping resistor, and/or an inductor depending upon desired circuit characteristics. It should be understood that these steps can be performed in any order.

FIG. 2A shows an example of an RFID disabling apparatus (band) 200 for use with a single-use locking mechanism 214 as explained with reference to FIG. 1A. In this configuration, the substrate includes a series of holes 212 to engage with the single-use locking mechanism 214. The substrate 210 can be formed of a single layer or multiple layers. The substrate 210 should be made of suitable materials such as polyester, polyimide, nylon, vinyl, Tyvek™ or other appropriate materials. (Tyvek is a trademark of E. I. du Pont de Nemours and Company for man-made materials.). Although not shown, it should be understood that the band 200 can be made for use with an adhesive locking mechanism as explained with reference to FIG. 1B.

FIG. 2B shows an "off-the-shelf" RFID circuit 230 disposed on the substrate 210 of FIG. 2A. The RFID circuit 230 is preferably a standard RFID circuit known in the industry, such as a 13.56 MHz Tag-It® Inlay, a Philips iCode® Inlay, or any other prefabricated RFID tag compliant with the ISO/IEC 15693, ISO/IEC 14443, or other appropriate RFID standards. (Tag-It is a registered trademark of Texas Instruments. iCode is a registered trademark of Koninklijke Philips Electronics NV). A typical RFID circuit 230 includes an RFID transponder chip 231 and an antenna element 233. The antenna element 233 can be a coiled antenna as shown in FIG. 2B.

FIG. 2C shows a partial view of the substrate 210 and RFID circuit 230 after the RFID circuit 230 has been severed. The antenna element 233 of the RFID circuit 230 is severed at a point on its outer periphery to facilitate connection to the conductive loop 250 (FIG. 2D). The RFID circuit 230 can be severed using laser cutting or any known technique for creating a first end point 232 and a second endpoint 234. The step of severing in this manner necessarily creates a gap 236 between the first end point 232 and the second endpoint 234. It should be understood that severance of the RFID circuit 230 can be at any point on the circuit.

FIG. 2D shows a conductive loop 250 coupled to the severed RFID circuit 230 of FIG. 2C. The conductive loop 250 is disposed on and run along substantially the entire length of the substrate 210. A first end of the conductive loop 250 is coupled to the first end point 232 of the RFID circuit 230 and a second end of the conductive loop 250 is coupled to the second end point 234 of the RFID circuit 230. Solder or any other means known can be used to couple of the conductive loop 250 to the RFID circuit 230. The conductive loop 250 can be made of any insulated or uninsulated conductor. The gauge (e.g., diameter, thickness) of the conductor should be chosen to be small to facilitate breakage if the band 200 is tampered with. Of course, if the wearer attempts to remove the band 200 with a cutting implement, the conductor forming loop 250 will also be severed as the band 200 is severed. Although the conductive loop 250 is shown on a single layer of the substrate 210, it should be understood that the conductive loop 250 can be formed on multiple layers of the substrate 210 and can also encompass the single-use locking mechanism 214.

Figure 2E:
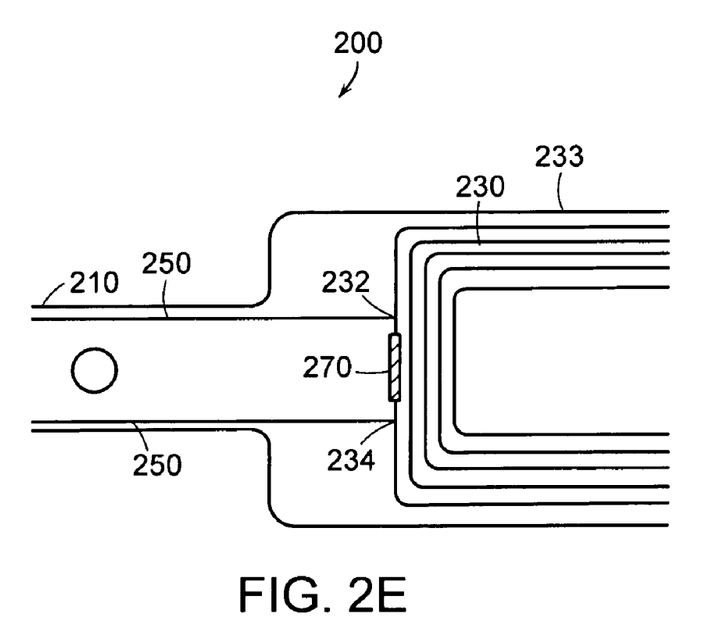

FIG. 2E shows a partial view of the substrate 210, the RFID circuit 230, the conductive loop 250, and the optional tuning component 270. As shown, the tuning component 270 is coupled in series with the RFID circuit 230 and the tuning component 270 is coupled in parallel with the conductive loop 250. The optional component 270 can be used if the resonant frequency of the RFID circuit 230 needs to be further controlled because of the addition of the conductive loop 250. In particular, the prefabricated RFID circuit 230 including an antenna element 233 has typically been designed to operate within a particular radio frequency range. However, the severing of the antenna element 233 and introduction of the conductive loop 250 may alter the electrical characteristics unfavorably. The optional tuning component 270 allows for further control of the resonant operating frequency of the entire system. The optional tuning component 270 can be a chip capacitor, a swamping resistor, an inductor or any other component that adjusts the RFID circuit 230 to the desired resonant state. In one embodiment, the optional component 270 can be included on the same integrated circuit as the RFID circuit 230. The optional tuning component 270 can be comprised of more than one individual piece. For example, two chip capacitors could be placed in series with one another to serve the function of a single capacitor with larger capacitance.

While this invention has been particularly shown and described with references to preferred embodiments thereof, it will be understood by those skilled in the art that various changes in form and details may be made therein without departing from the scope of the invention encompassed by the appended claims. For example, the RFID disabling apparatus can be used for tagging luggage, inventory, and other like uses.

What is claimed is:

1. A method of manufacturing an RFID disabling apparatus, comprising:
disposing an integrated, prefabricated RFID circuit on a wristband;
disposing security disabling a conductive loop on the wristband, the conductive loop having a first end and a second end;
coupling the first end of the conductive loop to a first endpoint of the RFID circuit and coupling the second end of the conductive loop to a second endpoint of the RFID circuit; and
coupling one end of at least one electronic component to the first endpoint of the RFID circuit and coupling the other end of the at least one electronic component to the second endpoint of the RFID circuit to correct the resonance of the RFID circuit with the addition of the conductive loop.

2. The method of claim 1, wherein a portion of the RFID circuit is severed to create the first endpoint and the second endpoint.

3. The method of claim 2, wherein the severing step is carried out by laser cutting.

4. The method of claim 2, wherein the severing step creates a gap between the two endpoints.

5. The method of claim 1, wherein the at least one electronic component is coupled in series with the first and second endpoints.

6. The method of claim 5, wherein the conductive loop is coupled in parallel with the at least one electronic component.

7. The method of claim 1, wherein at least another electronic component is coupled in series or in parallel to the at least one electronic component.

8. The method of claim 1, wherein an electronic component is selected from a group consisting of a capacitor, a resistor, and an inductor.

9. The method of claim 1, wherein the electronic component is a capacitor.

10. The method of claim 9, wherein the capacitor is a resonant chip capacitor.

11. The method of claim 10, wherein a value of the resonant chip capacitor is chosen to correct the resonance of the RFID circuit with the addition of the conductive loop to the RFID circuit.

12. The method of claim 1, wherein the electronic component is a swamping resistor.

13. The method of claim 1, wherein the conductive loop is run along substantially the entire length of the wristband.

14. The method of claim 1, wherein the conductive loop is thus connected to the RFID circuit such that a break in the conductive loop disables the RFID circuit.

15. The method of claim 1, wherein the wristband includes a series of holes along a length thereof.

16. The method of claim 1, wherein the wristband is formed of multiple layers.

17. The method of claim 1, wherein the conductive loop is insulated.

18. The method of claim 1, wherein the RFID circuit includes an RFID transponder chip and an antenna element.

19. The method of claim 18, wherein a portion of the antenna element is severed to create the first and second endpoints.

20. The method of claim 18, wherein the antenna element is a coiled antenna.

21. The method of claim 1, wherein the RFID circuit is severed at a point located on an outer periphery of the RFID circuit.

22. The method of claim 1, wherein the RFID circuit is a prefabricated RFID circuit.

23. The method of claim 1, wherein the combination of the conductive loop and the RFID circuit span substantially the entire length of the wristband.

24. An RFID disabling apparatus, comprising:
a prefabricated RFID circuit disposed on a wristband, the RFID circuit including:
a transponder chip;
an antenna;
a conductive loop disposed security disabling on the wristband coupled in series to the RFID circuit; and
an electronic component, coupled in parallel to the conductive loop, that corrects the resonance of the RFID circuit with the addition of the conductive loop.

25. The apparatus of claim 24, wherein the electronic component is selected from a group consisting of a capacitor, a resistor, and an inductor.

26. The apparatus of claim 24, wherein the electronic component is a resonance chip capacitor.

27. The apparatus of claim 26, wherein a value of the capacitor is chosen to correct the resonance of the RFID circuit with the addition of the conductive loop to the RFID circuit.

28. The apparatus of claim 24, wherein the electronic component is a swamping resistor.

29. The apparatus of claim 24, wherein the conductive loop is run along substantially the entire length of the wristband.

30. The apparatus of claim 24, wherein the wristband includes a series of holes along a length thereof.

31. The apparatus of claim 24, wherein the wristband is formed of multiple layers.

32. The apparatus of claim 24, wherein the conductive loop is insulated.

33. The apparatus of claim 24, wherein the antenna element is a coiled antenna.

34. The apparatus of claim 24, wherein the combination of the conductive loop and the RFID circuit span substantially the entire length of the wristband.

* * * * *

UNITED STATES PATENT AND TRADEMARK OFFICE
CERTIFICATE OF CORRECTION

PATENT NO. : 7,283,054 B2  Page 1 of 1
APPLICATION NO. : 11/069883
DATED : October 16, 2007
INVENTOR(S) : Joshua M. Girvin, John W. Lerch and Roger W. Pryor It is certified that error appears in the above-identified patent and that said Letters Patent is hereby corrected as shown below:

On the Title Page Item (73) Assignee, delete "Melborne" and insert --Melbourne--.

Column 6
Line 28, insert --a-- before "security disabling".

Column 8
Line 1, delete "a conductive loop disposed security disabling on the", and insert --a security disabling conductive loop disposed on the--.

Signed and Sealed this

Twenty-ninth Day of July, 2008

JON W. DUDAS
*Director of the United States Patent and Trademark Office*